(12) United States Patent
Theodoulou et al.

(10) Patent No.: US 11,453,010 B2
(45) Date of Patent: Sep. 27, 2022

(54) SOLID WASTE TREATMENT PROCESS

(71) Applicant: BL Technologies, Inc., Minnetonka, MN (US)

(72) Inventors: Michael Theodoulou, Milton (CA); Youngseck Hong, Oakville (CA); Nick Braithwaite, Chesterfield (GB); Marion De Backer, Horncastle (GB)

(73) Assignee: BL TECHNOLOGIES, INC., Minnetonka, MN (US)

( * ) Notice: Subject to any disclaimer, the term of this patent is extended or adjusted under 35 U.S.C. 154(b) by 169 days.

(21) Appl. No.: 16/157,458

(22) Filed: Oct. 11, 2018

(65) Prior Publication Data

US 2019/0111440 A1 Apr. 18, 2019

Related U.S. Application Data

(60) Provisional application No. 62/572,133, filed on Oct. 13, 2017.

(51) Int. Cl.
*B01D 21/00* (2006.01)
*B02C 18/00* (2006.01)
(Continued)

(52) U.S. Cl.
CPC .......... *B02C 23/20* (2013.01); *B02C 18/0092* (2013.01); *B03B 9/06* (2013.01); *B01D 21/267* (2013.01)

(58) Field of Classification Search
CPC .... B01D 21/267; B02C 18/0092; B02C 23/20
See application file for complete search history.

(56) References Cited

U.S. PATENT DOCUMENTS 3,963,637 A * 6/1976 Chappell ............... C02F 1/5236
252/181
5,587,320 A * 12/1996 Shindo ................... C12M 41/24
435/290.1
(Continued)

FOREIGN PATENT DOCUMENTS

EP 2006034 A2 12/2008

OTHER PUBLICATIONS

"Lift Station Basics", High Tide Technologies, https://htt.io/resources/lift-station-basics/, searched 2021.*
(Continued)

*Primary Examiner* — Nathan A Bowers

(57) ABSTRACT

In an apparatus and process described, an organic fraction of solid waste is separated from light contaminants such as plastics and heavy contaminants such as grit. The organic fraction is subsequently processed by anaerobic digestion, which converts volatile solids to gas. In a first stage of the process, the waste is processed through a separator such as a vertical mill, which removes light fraction contamination, reduces organics particle size and dilutes the waste to thereby produce a slurry. In a second stage of the process, the slurry passes through a grit removal system, which removes heavy and settleable material, for example by way of a hydrocyclone. The light and heavy fraction contaminants are not carried through to the digestion process. The particle size of the organics is also reduced to facilitate digestion and the slurry has a dry solids concentration suitable for anaerobic digestion.

20 Claims, 2 Drawing Sheets

(51) Int. Cl.
  *B02C 23/20* (2006.01)
  *B03B 9/06* (2006.01)
  *B01D 21/26* (2006.01)

(56) References Cited

U.S. PATENT DOCUMENTS

| | | | | |
|---|---|---|---|---|
| 2008/0035561 A1* | 2/2008 | Gray (Gabb) | ......... | C05F 17/40 |
| | | | | 210/603 |
| 2008/0193994 A1* | 8/2008 | Choate | .................... | C12P 5/023 |
| | | | | 435/167 |
| 2010/0285574 A1* | 11/2010 | Genta | ................ | C08B 37/0057 |
| | | | | 435/289.1 |
| 2012/0067817 A1* | 3/2012 | Giraldo | .................. | C02F 3/302 |
| | | | | 210/605 |
| 2014/0251903 A1* | 9/2014 | Shih | ......................... | C05F 3/00 |
| | | | | 210/612 |
| 2014/0291259 A1* | 10/2014 | Gravett | ................. | B01D 21/02 |
| | | | | 210/770 |
| 2015/0203393 A1* | 7/2015 | Dendel | ................ | C02F 11/121 |
| | | | | 210/741 |
| 2016/0207806 A1 | 7/2016 | Oude Grotebevelsborg | | |
| 2017/0022522 A1 | 1/2017 | De Lima Vasconcellos et al. | | |
| 2018/0304324 A1* | 10/2018 | Oude Grotebevelsborg | ............... | |
| | | | | B03B 9/06 |
| 2019/0091739 A1* | 3/2019 | Benedek | ................. | C12P 5/023 |
| 2020/0101506 A1 | 4/2020 | Josse et al. | | |

OTHER PUBLICATIONS

Suez Water Technologies & Solutions, "Monsal* Advanced Digestion Technology (ADT) Re:Sep* 2" Sep. 2018, p. 2.

* cited by examiner

US 11,453,010 B2

SOLID WASTE TREATMENT PROCESS

RELATED APPLICATIONS

This application claims the benefit of U.S. Provisional Application No. 62/572,133, Solid Waste Treatment Process, filed on Oct. 13, 2017, which is incorporated herein by reference.

FIELD

This specification relates to solid waste processing and anaerobic digestion.

BACKGROUND

Solid waste can have an organic fraction that can be processed using anaerobic digestion. In anaerobic digestion, a volatile portion of the organic solids beaks down to produce biogas and digestate. The biogas can be used to produce heat or power and the digestate has less volume than the organic waste and may be more easily stabilized. Anaerobic digestion is therefore potentially useful to divert an organic fraction of solid waste from landfill. However, solid waste typically contains various other materials that are detrimental to the operation of most anaerobic digesters.

INTRODUCTION TO THE INVENTION

Solid waste having an organic component can include, for example, municipal solid waste, source separated organic waste, and commercial and industrial waste. An apparatus and process described herein is used to separate an organic fraction of the waste from heavy (i.e. grit) and light (i.e. solid foam and plastic) contaminants. The cleaned organic fraction is subsequently processed by anaerobic digestion, which converts volatile solids to biogas among other things.

In a first stage of the process, the waste is processed through a separator, for example a vertical mill or depackaging machine, which removes light contaminants and may also reduces the size of the organics. Liquid may be added to dilute the organic waste. The liquid may be a recycled water or wastewater when these are available. The organic waste is optionally diluted down to a solids content of 10-12% dried solids, which may help improve the separation of the light contaminants from the organic materials. A slurry or other stream of macerated and/or comminuted organic matter with a reduced concentration of light contaminants emerges through openings in the separator.

In a second stage of the process, the slurry passes through a grit removal system optionally including a hydrocyclone. This system removes heavy and/or settleable material, such as glass, sand, bones, etc from the slurry.

The process thereby removes both light and heavy fraction contaminants so that they are not carried through to downstream process such as the digestion process. The particle size of the organics is also reduced to facilitate digestion. The resulting organic slurry can also have a dry solids concentration suitable for the digestion process. A corresponding system includes a light fraction separator and a grit removal system.

DETAILED DESCRIPTION

The terms "light" and "heavy" are used in this specification as in colloquial or informal language and not according to their strict scientific or engineering meanings or to imply any particular or relative weight. The term "light" can include non-organic materials such as plastic (for example pieces of plastic film or bags) or foam (for example foam packaging) that are light relative to their surface area and/or volume compared to other components of the solid waste, for example the organic components. The term "heavy" can include non-organic particles that are heavy relative to their surface area and/or volume compared to other components of the solid waste, for example the organic components. The heavy fraction can contain particles that are very small but typically settle in water. Small (i.e. 5 mm or less) heavy contaminants are often referred to as "grit" in the art and the word "grit" may be used herein for convenience to refer to heavy contaminants generally or where a significant portion of the heavy contaminants are likely to be small.

A waste processing facility may receive solid waste including organic material such as source-separated organics, municipal solid waste that has been pre-processed to remove large and recyclable components, or commercial or industrial wastes such as restaurant or food processing waste.

In a system and process described herein, solid wastes are treated to separate contaminants (i.e. inert or non-organic materials) from an organic fraction, which is converted into a digestible slurry. This is achieved, in part, by increasing the liquid content of the solid waste. A light fraction separator optionally provides milling and centrifugal force screening of the solid waste. A resulting slurry is de-gritted and fed to an anaerobic digester. One or more liquid biowastes may be used as the dilution liquid or fed directly into the digestion process.

The separation process removes non-organic materials, including a light fraction (i.e. plastics, packaging, etc.) as well as a heavy fraction (i.e. grit). Early separation can reduce damage to downstream processing equipment, such as for pumping, heating and mixing, as well as allowing for the digestion process to operate with the greater efficiency.

Figure 1:
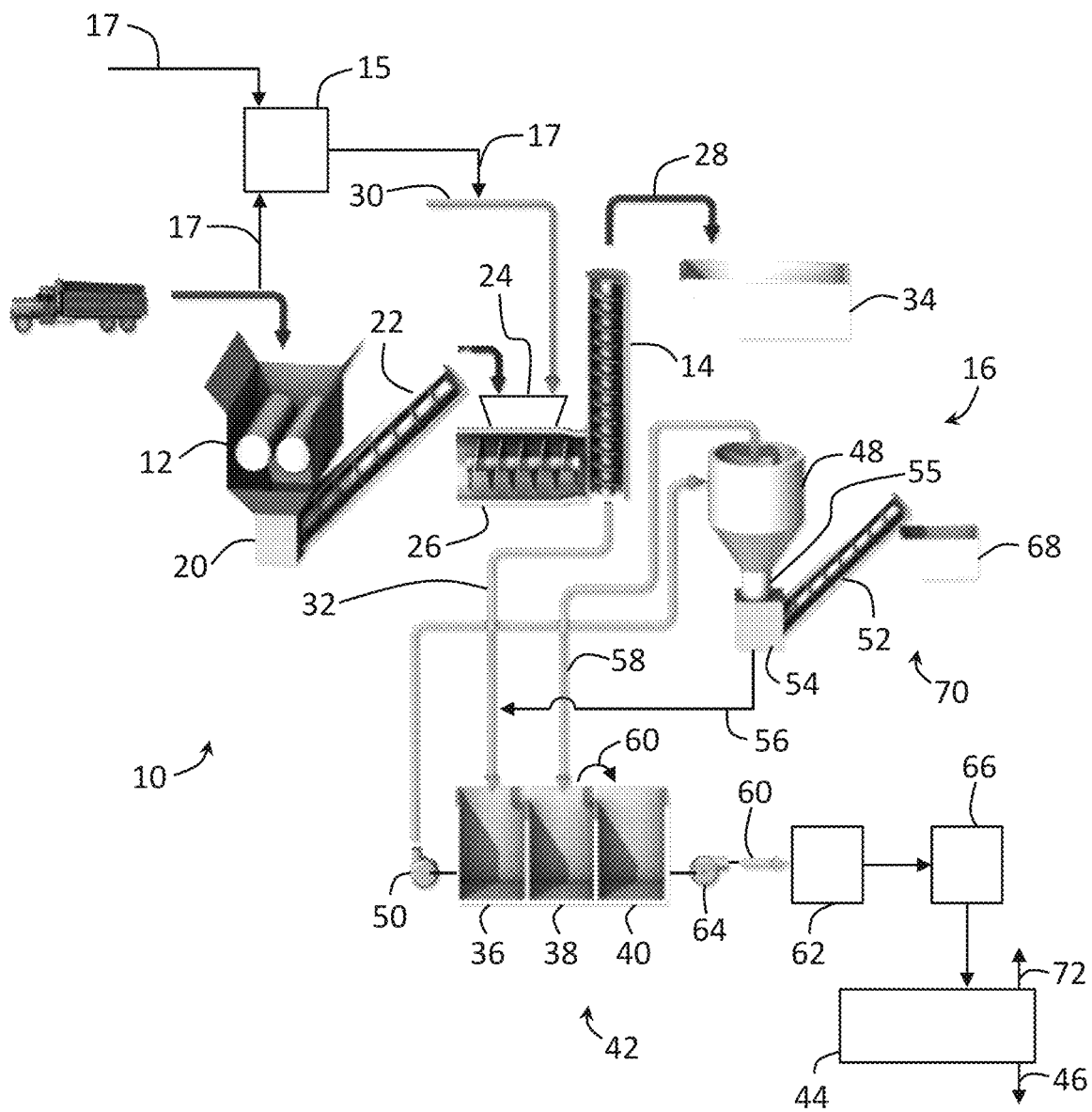
FIG. 1 is a schematic drawing of a solid waste processing or separating system.

Referring to FIG. 1, solid waste 18 is offloaded from delivery trucks 19 into a waste reception area, typically with retainer walls, within a reception building. The reception area is provided with a drainage system where waste liquids 17 are collected in a floor drainage sump and flow to a storage tank 15. One or more other sources of waste liquid 17, for example sludge from settling tanks or wastewater treatment plants or liquid fat, oil & grease (FOG) waste may be delivered by tanker into the storage tank 15. The contents of the storage tank 15 may be mixed and the storage tank 15 may be insulated and heated to prevent solidification or stratification of the fat, oil or grease. Waste liquid 17 may be used as liquid 30 to dilute the solid waste 30 as described further below and/or pumped to an anaerobic digester 44.

The solid waste 18 may be moved from the reception area, for example with a front end loader, to a separation system 10. The separation system 10 has a shredder 12, a light fraction separator 14, and a grit removal system 16. The shredder 12 is optional and may be used, or not, depending on the characteristics of the solid waste 18. If used, the shredder 12 may be included on top of a hopper 20 for a feed conveyor 22. Alternatively, the solid waste 18 may be sent directly to the hopper 20. The shredder 12 is typically added where the solid waste 18 requires size reduction (i.e. large meat carcasses) and/or would benefit from opening of packaging (i.e. cans). The feed conveyor 22 may be, for example, a shaftless single screw conveyor located, typically on an incline, so as to deliver solid waste to the light fraction separator 14. The feed conveyor 22 may be, for example, a conveyor driven by a direct drive motor on a variable frequency drive (VFD). Optionally, the feed conveyor 26 may be completely enclosed.

The light fraction separator 14 may have a second feed hopper 24 in communication with a second feed conveyor 26. The second feed conveyor 26 may have, for example, a 16" diameter conveyance screw. The second feed hopper 24 optionally provides buffer volume between the light fraction separator 14 and the batch feeding of a front-end loader delivering solid waste 18 to the feed conveyor 22. The conveyance screw in the second feed conveyor 26 may be powered, for example, by a single drive motor with a variable frequency drive.

The light fraction separator 14 separates a light fraction 28 from the solid waste 18. The light fraction 28 can include, for example, pieces of plastic foil or bags, foam packaging or packing materials etc. The light fraction 28 is lifted in the light fraction separator 14 by a rotor and removed from the top of the light fraction separator 14. The light fraction separator 14 may also dilute, macerate (i.e. moisten) and/or comminute the solid waste 18. Liquid 30 for maceration and/or dilution is added to the light fraction separator 14 directly or through the second feed hopper 24 or second feed conveyor 26. Comminution is accomplished by blades, paddles, knives or similar structures attached to the rotor. The light fraction separator 14 may alternatively be called a vertical mill or depackaging machine (DPM) although all devices called by these names might not be suitable. In one example, the light fraction separator 14 is a DPM 620 unit available from TMA Maschinenbau Thalhamer GmbH.

The light fraction separator 14 of FIG. 1 has a vertically oriented rotor including a rotating shaft and fixed paddles or blades. The rotor optionally rotates at high speed. The rotor is surrounded by a cylindrical wall. The cylindrical wall has openings, for example because some or all of it is made of a perforated or mesh screen. The openings may have one or more sizes. The opening size may be selected in view of, for example, the feedstock characteristics and desired separation efficiency.

In operation, an organic fraction 32 of the solid waste 18 is pushed through the openings while light fraction 28 material is rejected by the openings and travels to the top of the light fraction separator 14. The paddles or blades of the rotor may be mounted obliquely to the shaft of the rotor to help lift the light fraction 28. The light fraction 28 may be ejected onto a conveyor and drop into a bin 34, for example a 40 foot roll off type bin. Some heavy objects that resist comminution and are too large to pass through the openings may reside in the light fraction separator 14 and eventually be ejected with the light fraction 28. However most of the heavy contaminants are carried through the openings with the organic matter 32 to be removed in the grit removal system 16 as described further below.

The organic fraction 32 typically forms a slurry either inside of the cylindrical wall or as it passes through the openings. Liquid 30 is added in an amount effective to create a desired consistency of discharged slurry. Optionally, liquid 30 may be injected into the light fraction separator 14 at a number of points to also wash the screened section or sections. This organic fraction 32 slurry can drain by gravity from light fraction separator 14 into the grit removal system 16.

The light fraction separator 14 of FIG. 1 performs two functions that help enable effective operations of an anaerobic digester 44 that will receive the organic fraction 32. Firstly, the light fraction separator 14 controls the solid content of the organic fraction 32. The solids content of the organic fraction 32 can be controlled by setting and/or adjusting the flow of liquid 30. The solids content of the organic fraction 32 can be measured as it leaves the light fraction separator 14 or as it enters the digester 44 or both. A design or target solids content of the organic fraction 32 may be up to 12% dried solids (DS). A control system may allows pre-selection of the liquid 30 flow rate based on the type and feed rate of solid waste 18. Alternatively, the control system may automatically adjust the flow rate of the liquid 30 liquid based on one or more measurements of organic fraction 32 solids content. Optionally, both control strategies, or another control strategy, may be used.

Secondly, the light fraction separator 14 removes light contaminants such as packaging, plastics, etc. This helps protect the downstream plant and equipment and also helps ensure that digestate 46 produced by the digester 44 complies with required standards for contamination. The digester 44 also produces biogas 72.

Figure 2:
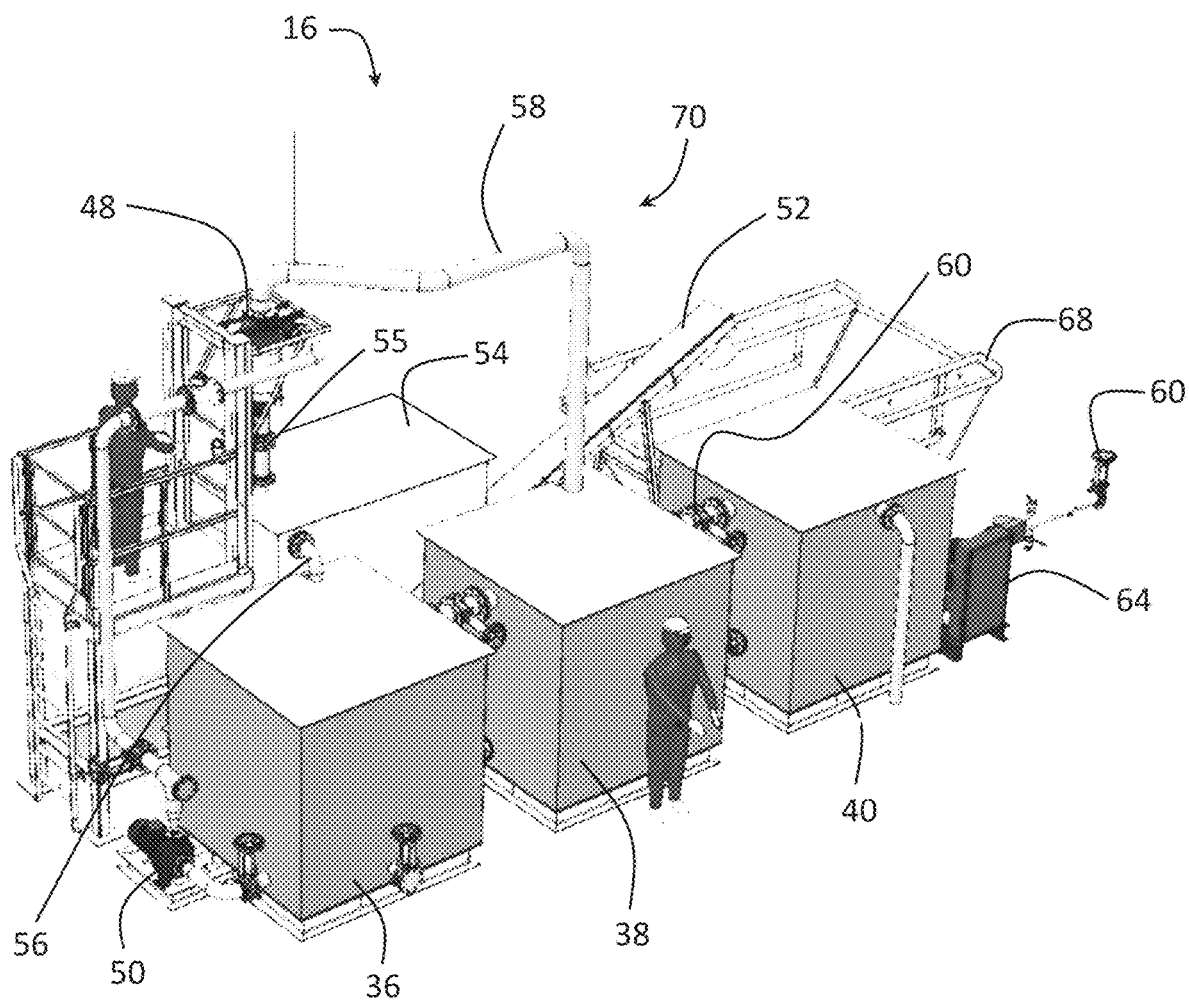
FIG. 2 is a schematic drawing of grit removal process units from FIG. 1.

Referring to FIGS. 1 and 2, the organic fraction 32 slurry is collected below the light fraction separator 14 in a grit tank 36. Grit tank 36 may be a separate tank within a set of grit staging tanks 42 as shown in FIG. 2 or part of a multiple chamber grit staging tank 42 as in FIG. 1.

The grit removal system 16 is designed to separate heavy matter such as grit from the organic fraction 32 slurry discharged from the light fraction separator 14. Removal of grit is useful as it is very abrasive and can rapidly wear mechanical equipment and piping downstream, for example between or in the anaerobic digestion process units. Additionally, while grit may not settle efficiently in a high solids slurry, as the digestion process occurs, and the solids concentration drops due to the volatilization of solids into biogas, grit will become prone to settling in a tank of the digester 44 if it is not removed beforehand.

The grit removal system 16 is located to remove this material prior to it interacting with rotating mechanical equipment. This also reduces settling in anaerobic digestion tanks compared to removing grit from digestate 46. The main components of the grit removal system 16 are the grit staging tank(s) 42 (including or sub-divided into tanks 36, 38, 40), a hydrocyclone 48 optionally with dedicated feed pump 50, and a grit washing system 70.

The hydrocyclone feed pump 50 pumps the organic fraction 32 slurry from the grit tank 36 to the hydrocyclone 48 via a flowmeter. The hydrocyclone feed pump 50 can be selected to handle highly abrasive slurries, and to provide the hydrocyclone 48 with a constant feed flow and pressure. The design flow rate of the hydrocyclone feed pump 50 can be more than, for example approximately 150% of, the throughput flow of the hydrocyclone 48. This gives a positive recycle back to the grit tank 36, for example through an underflow grit bin 54 and overlow pipe 56 as shown in FIG. 2.

The grit staging tank(s) 42 provide a grit tank 36, clean tank 38 and hydrolysis buffer tank feed tank 40. As mentioned above, organic matter 32 slurry is initially discharged into the grit tank 36. This tank serves as a staging tank to pump slurry to the hydrocyclone 48 for grit removal.

The clean tank 38 is where an overflow return 58 of the hydrocyclone 48 is directed. The clean tank 38 has a lower connection to the grit tank 36 to allow for any concentrated slurry still containing grit on the bottom of the clean tank 38 to be recycled to the grit tank 36. Clean slurry 60 travels, for example by overflow, from the clean tank 38 to the hydrolysis buffer tank feed tank 40. From this tank, the clean slurry 60 is pumped to the hydrolysis buffer tank 62, optionally via dedicated clean slurry feed pump 64. Hydrolysis buffer tank 62 can be used, for example, to hold the clean slurry 60 until it can be pumped to a hydrolysis unit 66.

The hydroysis unit 66 can be, for example, an enzymic hydrolysis unit sold by Monsal or Suez. In this type of hydrolysis unit 66, the clean slurry 60 passes in a series batch process through a series of tanks with temperature and hold times selected to enhance the breakdown of the clean slurry 60 via enzymes, which may be produced by naturally occurring bacteria. Alternatively, a thermal and/or mechanical hydrolysis unit 66 can be used. Optionally, the hydrolysis unit 66 can be omitted. However, a hydrolysis unit 66 can be useful in particular when the clean slurry 60 has a high solids content, for example 10% DS or more. At this high solids content, a simple wet digester (i.e. a mixed anaerobic tank with pumpable and mixable sludge) can require significant retention time and mixing energy in the absence of a hydrolysis unit 66.

The hydrocyclone 48 is the main process unit whereby grit is separated from the organic fraction 32 slurry. Slurry is pumped from the grit tank 36 to the hydrocyclone 48. In the hydrocyclone 48, a vortex is induced which encourages the separation of grit from the main slurry stream. Grit, and its associated carrier liquid exits the bottom of the hydrocyclone 48 in underflow 55. The lighter fraction, overflow 58, exits the top of the hydrocyclone 48.

The overflow 58 from the hydrocyclone 48 is directed into the clean tank 38. The clean tank 38 can be connected to the grit tank 36 by an under baffle or pipe and optionally also by an over baffle or pipe. This helps to maintain a constant head feed to the hydrocyclone 48. When no or low flow of organic fraction 32 is entering the grit tank 36, more of the overflow 58 liquid is recycled back to grit tank 36. When more organic fraction 32 enters the grit tank 36, the clean tank 38 and possibly also the grit tank 36 overflow via a weir or pipe from the clean tank 38 to the hydrolysis buffer tank (HBT) feed tank 40. The HBT feed tank 40 optionally has level controls and supplies pump suction for the HBT feed pump 64.

The underflow 55 flows by gravity to the grit washer/conveyor 52 through the underflow grit bin 54. In the grit washer/conveyor 52, a liquid portion of the underflow 55 is separated off via an overflow that flows by gravity back to the underflow grit bin 54. Grit settles in the bottom of underflow grit bin 54. An auger, for example a fixed speed auger, slowly lifts the grit out of the underflow grit bin 54 and discharges it into a grit disposal bin 68 via the grit conveyor/washer 52. Washwater can be introduced into the grit washer/conveyor 52 periodically, for example by a timer connected to a solenoid valve. Wash liquid returns with a liquid portion of the underflow 55 to the underflow grit bin 54. Excess liquid in the underflow grit bin 54 overflows to the grit tank 36 as grit bin overflow 56. Underflow grit bin 54 may be considered to be part of a grit washing system 70 with the grit washer/conveyor 52.

Waste grit is discharged from the grit washer/conveyor 52 and drops into a grit disposal bin 68. The grit disposal bin 68 may be, for example, a 40 ft roll off type.

Following the removal of light contaminants and grit, the clean slurry 60 is fed to the hydrolysis buffer tank 62 via a clean slurry feed pump 64.

In an example, about 92% of solids were removed in a hydrocyclone. Most particles in the underflow were 2-5 mm in size. Particles in the underflow were, for example, eggshells, stones and seeds. Particles over 2 mm in size in the overflow were mostly soft organics.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

We claim:

1. A system for processing solid waste comprising,
a light fraction separator configured to separate the solid waste into a light fraction and a slurry;
a grit removal system to produce a de-gritted slurry, the grit removal system comprising one or more grit staging tanks and a hydrocyclone, the one or more grit staging tanks comprising a first portion and a second portion, wherein:
the first portion is in fluid communication with the light fraction separator to accept the slurry and configured to serve as a staging tank before the slurry is sent to the hydrocyclone,
the hydrocyclone is in fluid communication with the first portion and configured to separate the grit from the slurry, and,
the second portion is in fluid communication with the hydrocyclone and configured to accept an overflow from the hydrocyclone,
a recycle flow path connecting the second portion to the first portion; and,
an anaerobic digester configured to receive the de-gritted slurry from the grit removal system.

2. The system of claim 1 wherein the light fraction separator has an inlet for dilution liquid.

3. The system of claim 1 wherein the light fraction separator comprises a vertically oriented rotor inside of a cylindrical wall.

4. The system of claim 3 wherein the rotor comprises one or more macerating or comminuting blades.

5. The system of claim 4 wherein the one or more blades are angled relative to a shaft of the rotor so as to lift solids within the cylindrical wall, and wherein the light fraction is collected from the inside of an upper end of the cylindrical wall.

6. The system of claim 3 wherein the cylindrical wall has a plurality of openings, and wherein the slurry is collected from outside of the cylindrical wall.

7. The system of claim 1 wherein the anaerobic digester comprises a wet digester.

8. The system of claim 1 wherein the grit removal system further comprises a grit washing system.

9. The system of claim 1 wherein the first portion comprises a grit tank and the second portion comprises a clean tank.

10. A process for treating solid waste comprising,
separating the solid waste into a light fraction and a slurry;
de-gritting the slurry by at least treating the slurry in one or more grit staging tanks and a hydrocylone, wherein the de-gritting comprises,
    staging the slurry in a first portion of the one or more grit staging tanks before flowing the slurry to the hydrocyclone;
    separating grit from the slurry in the hydrocyclone; and,
    flowing an overflow of the hydrocyclone to a second portion of the one or more grit staging tanks that is in fluid communication with the first portion;
recycling a portion of the slurry from the second portion of the one or more grit staging tanks back to the first portion of the one or more grit staging tanks; and,
anaerobically digesting the de-gritted slurry.

11. The process of claim 10 wherein the step of separating the solid waste further comprises macerating and/or comminuting the solid waste.

12. The process of claim 11 wherein the step of separating the solid waste comprises adding water to the solid waste.

13. The process of claim 10 wherein the slurry is produced through openings in a wall while the light fraction is retained by the wall.

14. The process of claim 13 wherein the solid waste is diluted and comminuted upstream of the wall.

15. The process of claim 14 wherein the solid waste is treated by a rotor inside of vertically oriented cylindrical wall.

16. The process of claim 10 wherein the slurry has a dried solids content of 12% or less.

17. The process of claim 10 wherein the slurry is treated in a wet anaerobic digester.

18. The process of claim 10 wherein the slurry is treated by hydrolysis prior to anaerobic digestion.

19. The process of claim 18 wherein the slurry is treated by enzymatic hydrolysis.

20. The process of claim 10 wherein the first portion comprises a grit tank and the second portion comprises a clean tank.

* * * * *